(12) United States Patent
Shan et al.

(10) Patent No.: US 10,999,796 B2
(45) Date of Patent: May 4, 2021

(54) SYSTEM INFORMATION SENDING METHOD, SYSTEM INFORMATION UPDATE METHOD, AND DEVICE

(71) Applicant: Huawei Technologies Co., Ltd., Guangdong (CN)

(72) Inventors: Baokun Shan, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 50 days.

(21) Appl. No.: 16/029,217

(22) Filed: Jul. 6, 2018

(65) Prior Publication Data

US 2018/0317171 A1    Nov. 1, 2018

Related U.S. Application Data

(63) Continuation of application No. PCT/CN2016/070441, filed on Jan. 7, 2016.

(51) Int. Cl.
*G08C 17/00* (2006.01)
*H04W 52/02* (2009.01)
(Continued)

(52) U.S. Cl.
CPC ... *H04W 52/0216* (2013.01); *H04W 52/0229* (2013.01); *H04W 68/005* (2013.01); *H04W 76/28* (2018.02)

(58) Field of Classification Search
None
See application file for complete search history.

(56) References Cited

U.S. PATENT DOCUMENTS

2010/0167750 A1*  7/2010  Lee .................. H04W 48/12
                                                     455/450
2012/0052860 A1    3/2012  Faronius et al.
(Continued)

FOREIGN PATENT DOCUMENTS

CN    102215567 A    10/2011
CN    102821454 A    12/2012
(Continued)

OTHER PUBLICATIONS

Qualcomm Incorporated, "Introducing extended DRX," R2-157167, 3GPP TSG-RAN WG2 Meeting #92, Anaheim, USA, Nov. 16-20, 2015, 42 pages.

(Continued)

*Primary Examiner* — Phirin Sam
(74) *Attorney, Agent, or Firm* — Fish & Richardson P.C.

(57) ABSTRACT

A system information sending method is provided, to resolve a technical problem that UE may not receive a paging message when a DRX cycle is greater than an MP. A network device may separately set a modification period (namely, a first period) for first-type system information (which, for example, may include paging configuration information), to ensure that the first-type system information is not to be modified in the first period. For example, the first period may be greater than a DRX cycle. In this way, when a terminal device wakes up based on the DRX cycle, a time when the terminal device wakes up is still in the first period. The terminal device may normally receive a paging message indicating that the paging configuration information is to be modified, thereby obtaining new paging configuration information in time and avoiding missing a subsequent paging message.

20 Claims, 4 Drawing Sheets

Start

A network device sends first-type system information to a terminal device based on a first period, where content of first-type system information sent by the network device in one first period is unchanged, and the first period is a maximum DRX cycle that can be configured for the terminal device, or the first period is a modification period set by the network device for the first-type system information — 201

(51) Int. Cl.
*H04W 68/00* (2009.01)
*H04W 76/28* (2018.01)

(56) References Cited

U.S. PATENT DOCUMENTS

| | | | | |
|---|---|---|---|---|
| 2014/0293901 | A1* | 10/2014 | Hegde | H04W 48/16 370/329 |
| 2014/0307621 | A1* | 10/2014 | Frenger | H04W 56/0025 370/328 |
| 2014/0334353 | A1* | 11/2014 | Wei | H04W 72/1263 370/280 |
| 2015/0181575 | A1* | 6/2015 | Ng | H04L 5/0092 370/329 |
| 2015/0334637 | A1* | 11/2015 | Kim | H04W 52/365 370/312 |
| 2015/0341978 | A1* | 11/2015 | Rune | H04W 48/12 370/254 |
| 2016/0081110 | A1* | 3/2016 | Suzuki | H04L 5/0053 370/336 |
| 2016/0198406 | A1* | 7/2016 | Hoglund | H04W 48/08 370/311 |
| 2016/0242231 | A1* | 8/2016 | Vajapeyam | H04W 4/70 |
| 2016/0249404 | A1* | 8/2016 | Hoglund | H04W 36/16 |
| 2017/0048920 | A1* | 2/2017 | Kim | H04W 4/70 |
| 2017/0064764 | A1* | 3/2017 | Ke | H04W 76/18 |
| 2017/0135026 | A1* | 5/2017 | Frenger | H04W 48/08 |
| 2018/0234917 | A1* | 8/2018 | Kim | H04W 52/0216 |
| 2019/0007945 | A1* | 1/2019 | Webb | H04W 4/70 |
| 2020/0187116 | A1* | 6/2020 | Kim | H04W 52/0216 |

FOREIGN PATENT DOCUMENTS

| | | |
|---|---|---|
| CN | 103368763 A | 10/2013 |
| CN | 103687068 A | 3/2014 |
| WO | 2015020590 A1 | 2/2015 |

OTHER PUBLICATIONS

Huawei, Hisilicon, "Extending DRX Cycle in Idle Mode," R2-156310, 3GPP TSG-RAN WG2 #92, Anaheim, US, Nov. 16-20, 2015, 3 pages.

Samsung, "Overview on DRX enhancements," R2-152726, 3GPP TSG RAN WG2 #90, May 25-29, 2015, Fukuoka, Japan, 4 pages.

CATT, "The Initial Impact Analysis on RAN for Extended DRX," R2-152131, 3GPP TSG RAN WG2 Meeting #90, Fukuoka, Japan, May 25-29, 2015, 4 pages.

\* cited by examiner

SYSTEM INFORMATION SENDING METHOD, SYSTEM INFORMATION UPDATE METHOD, AND DEVICE

CROSS-REFERENCE TO RELATED APPLICATIONS

This application is a continuation of International Application No. PCT/CN2016/070441, filed on Jan. 7, 2016, the disclosure of which is hereby incorporated by reference in its entirety.

TECHNICAL FIELD

The present application relates to the field of mobile communications technologies, and in particular, to a system information sending method, a system information update method, and a device.

BACKGROUND

A discontinuous reception (DRX) cycle is a new power-saving working mechanism introduced in a Long Term Evolution (LTE) system. In the DRX cycle, user equipment (UE) does not need to listen on a physical downlink control channel (PDCCH) when the user equipment is in an idle state (IDLE), thereby saving power.

In the LTE system, a concept of a modification period (MP) is defined. System information may be transmitted for a plurality of times in one MP. However, in a same MP, content of some system information (for example, paging configuration information) remains unchanged. When a base station needs to modify some (for example, paging configuration information) of system information, the base station first notifies, in an MP by using a paging message, UE that the paging configuration information is to be changed (but the base station does not send or use new paging configuration information in the current MP), and uses the new paging configuration information at a boundary at the beginning of a next MP. In the next MP, the base station sends the new paging configuration information. However, if a DRX cycle of the UE is greater than the MP, the UE may not receive the paging message indicating that a paging configuration information is to be modified, and consequently cannot obtain the new paging configuration information.

For example, referring to FIG. 1, FIG. 1 shows a process of updating paging configuration information in an LTE system. In FIG. 1, a base station intends to update paging configuration information in MP n+1, and therefore needs to notify, in a paging message in MP n, that the paging configuration information is to be changed. However, because a DRX cycle of UE is greater than an MP, MP n does not include a paging occasion (PO) of the UE. In other words, the UE does not wake up in MP n. Therefore, the UE can receive only a paging message in MP n−1, namely, a paging message 1, but cannot receive the paging message in MP n, namely, a paging message 2, and further, cannot receive the new paging configuration information. Therefore, when the UE wakes up based on the DRX cycle, the UE misses a subsequent paging message, for example, misses a paging message 3 in FIG. 1.

SUMMARY

This application provides a system information sending method, a system information update method, and a device, to resolve a technical problem that UE may not receive a paging message when a DRX cycle is greater than an MP.

According to a first aspect, a system information sending method is provided, including:

sending, by a network device based on a first period, first-type system information to a terminal device, where content of the first-type system information sent by the network device remains unchanged in one first period, and the first period is a maximum DRX cycle that can be configured for the terminal device, or the first period is a modification period set by the network device for the first-type system information.

The network device may separately set the modification period (namely, the first period) for the first-type system information (which, for example, may include paging configuration information), to ensure that the first-type system information is not to be modified in the first period. For example, the first period may be greater than a DRX cycle. In this way, when the terminal device wakes up based on the DRX cycle, a time when the terminal device wakes up is still in the first period. The terminal device may normally receive a paging message indicating that the paging configuration information is to be modified, thereby obtaining new paging configuration information in time and avoiding missing a subsequent paging message.

With reference to the first aspect, in a first possible implementation of the first aspect, the method further includes:

sending, by the network device, a paging message to the terminal device in an $i^{th}$ first period, where a DRX cycle of the terminal device is less than or equal to the first period, the paging message carries a first modification indication; the first modification indication is used to indicate whether first-type system information sent in a next first period is to be modified, or the first modification indication is used to indicate whether any system information sent in a next MP is to be modified; and i is a positive integer.

The network device may add the first modification indication to the paging message. When the terminal device wakes up based on the DRX cycle, a time when the terminal device wakes up is still in the first period. The terminal device may normally receive the paging message indicating that the paging configuration information is to be modified, thereby obtaining new paging configuration information in time and avoiding missing a subsequent paging message.

With reference to the first possible implementation of the first aspect, in a second possible implementation of the first aspect, the paging message further carries a second modification indication, the second modification indication is used to indicate whether second-type system information sent in the next MP or the next first period is to be modified, and the second-type system information includes other system information than the first-type system information.

The paging message may further carry the second modification indication. The second modification indication may be used to indicate a modification status of the second-type system information. In this way, the terminal device not only can determine whether to update the first-type system information but also can determine whether to update the second-type system information, thereby ensuring as much as possible that system information that needs to be updated can be updated in time.

With reference to the first possible implementation of the first aspect, in a third possible implementation of the first aspect, the method further includes:

sending, by the network device, a paging message to the terminal device in an $i^{th}$ first period, where a DRX cycle of the terminal device is less than or equal to the MP and less than or equal to the first period; the paging message carries a first modification indication; the first modification indication is used to indicate whether first-type system information sent in a next first period is to be modified, or the first modification indication is used to indicate whether any system information sent in a next modification period MP is to be modified; and i is a positive integer.

With reference to the first possible implementation of the first aspect, in a fourth possible implementation of the first aspect, the method further includes:

sending, by the network device, a paging message to the terminal device in an $i^{th}$ first period, where a DRX cycle of the terminal device is greater than the MP and less than or equal to the first period; the paging message carries a first modification indication; the first modification indication is used to indicate whether first-type system information sent in a next first period is to be modified; and i is a positive integer.

With reference to the fourth possible implementation of the first aspect, in a fifth possible implementation of the first aspect, the paging message further carries a second modification indication, the second modification indication is used to indicate whether second-type system information sent in a next MP or the next first period is to be modified, and the second-type system information includes other system information than the first-type system information.

With reference to the first aspect, in a sixth possible implementation of the first aspect, the method further includes:

sending, by the network device, a first system message in an $i^{th}$ first period, where the first system message carries a first modification indication; where the first modification indication is used to indicate whether other system information currently sent by the network device than the first system message has been modified relative to other system information stored in the terminal device than the first system message, or the first modification indication is used to indicate whether second-type system information, currently sent by the network device, other than the first system message has been modified relative to second-type system information, stored in the terminal device, other than the first system message; and the second-type system information includes other system information than the first-type system information, and i is a positive integer.

The network device may further add the first modification indication to the first system message, and the first modification indication may indicate modification statuses of different system information. When the terminal device wakes up based on the DRX cycle, a time when the terminal device wakes up is still in the first period. The terminal device may normally receive the first system message indicating that corresponding system information is to be modified, thereby updating the system information in time.

With reference to the sixth possible implementation of the first aspect, in a seventh possible implementation of the first aspect, the first system message further carries a second modification indication, and the second modification indication is used to indicate whether first-type system information currently sent by the network device has been modified relative to first-type system information sent by the network device in a previous first period.

The first system message may further carry the second modification indication. The second modification indication may be used to specially indicate whether the first-type system information is to be modified. For example, if the first-type system information may include paging configuration information, the second modification indication is used to specially indicate a modification status of the paging configuration information. The terminal device can more accurately update the paging configuration information in a more timely manner, thereby normally receiving a subsequent paging message.

With reference to any one of the first aspect or the first to the seventh possible implementations of the first aspect, in an eighth possible implementation of the first aspect, the first-type system information includes paging configuration information.

With reference to the eighth possible implementation of the first aspect, in a ninth possible implementation of the first aspect, the paging configuration information includes at least one of PCCH configuration information, information about a time-frequency resource on which the paging message is located, a quantity of times that the paging message is repeatedly sent to the terminal device, a window length of a paging window, a short DRX cycle in the paging window, and a modification period reset for the first-type system information.

The paging configuration information may include paging-related system information.

According to a second aspect, a system information update method is provided, including:

receiving, by a terminal device in an $i^{th}$ first period, a first message sent by a network device, where the first message carries a first modification indication, the first period is a modification period set by the network device for first-type system information, and i is a positive integer; and determining, by the terminal device based on the first modification indication, whether to update the first-type system information, where the first modification indication is used to indicate a modification status of the first-type system information or a modification status of any system information.

The network device may separately set the modification period (namely, the first period) for the first-type system information (which, for example, may include paging configuration information), to ensure that the first-type system information is not to be modified in the first period. For example, the first period may be greater than a DRX cycle. In this way, when the terminal device wakes up based on the DRX cycle, a time when the terminal device wakes up is still in the first period. The terminal device may normally receive a paging message indicating that the paging configuration information is to be modified, thereby obtaining new paging configuration information in time and avoiding missing a subsequent paging message.

With reference to the second aspect, in a first possible implementation of the second aspect, the method further includes:

determining, by the terminal device, that a DRX cycle configured for the terminal device is greater than an MP of second-type system information, and that the DRX cycle is greater than the first period; or determining, by the terminal device, that a DRX cycle configured for the terminal device is less than or equal to the first period.

With reference to the first possible implementation of the second aspect, in a second possible implementation of the second aspect, if the DRX cycle is less than or equal to the first period, the receiving, by a terminal device in an $i^{th}$ first period, a first message sent by a network device includes:

receiving, by the terminal device in the $i^{th}$ first period, a paging message that carries the first modification indication and that is sent by the network device; and the determining, by the terminal device based on the first modification indication, whether to update the first-type system information includes:

updating, by the terminal device, the first-type system information in an $(i+1)^{th}$ first period if the first modification indication is used to indicate that first-type system information sent in a next first period is to be modified; or updating, by the terminal device, the first-type system information in a next MP or an $(i+1)^{th}$ first period if the first modification indication is used to indicate that any system information sent in the next MP is to be modified.

After receiving the paging message, the terminal device may update the first-type system information at different time points based on a status indicated by the first modification indication.

With reference to the second possible implementation of the second aspect, in a third possible implementation of the second aspect, if the DRX cycle is less than or equal to the first period and less than or equal to the MP, the receiving, by a terminal device in an $i^{th}$ first period, a first message sent by a network device includes:

receiving, by the terminal device in the $i^{th}$ first period, a paging message that carries the first modification indication and that is sent by the network device; and the determining, by the terminal device based on the first modification indication, whether to update the first-type system information includes:

updating, by the terminal device, the first-type system information in an $(i+1)^{th}$ first period if the first modification indication is used to indicate that first-type system information sent in a next first period is to be modified; or updating, by the terminal device, the first-type system information in a next MP or an $(i+1)^{th}$ first period if the first modification indication is used to indicate that any system information sent in the next MP is to be modified.

With reference to the second possible implementation of the second aspect, in a fourth possible implementation of the second aspect, if the DRX cycle is less than or equal to the first period and greater than the MP, the receiving, by a terminal device in an $i^{th}$ first period, a first message sent by a network device includes:

receiving, by the terminal device in the $i^{th}$ first period, a paging message that carries the first modification indication and that is sent by the network device; and the determining, by the terminal device based on the first modification indication, whether to update the first-type system information includes:

updating, by the terminal device, the first-type system information in an $(i+1)^{th}$ first period if the first modification indication is used to indicate that first-type system information sent in a next first period is to be modified; or updating, by the terminal device, the first-type system information in a next MP or an $(i+1)^{th}$ first period if the first modification indication is used to indicate that any system information sent in the next MP is to be modified.

With reference to the second, the third, or the fourth possible implementation of the second aspect, in a fifth possible implementation of the second aspect, the updating, by the terminal device, the first-type system information in an $(i+1)^{th}$ first period includes:

determining, by the terminal device, a frame number of a superframe at the beginning of the $(i+1)^{th}$ first period; and updating, by the terminal device, the first-type system information in the superframe based on the determined frame number; or determining, by the terminal device, a frame number of a radio frame at the beginning of the $(i+1)^{th}$ first period; and updating, by the terminal device, the first-type system information in the radio frame based on the determined frame number.

Two manners of updating the first-type system information are provided. The terminal device may relatively flexibly perform update in different manners based on a situation. In addition, update is performed by determining a frame number, and therefore is relatively accurate.

With reference to the second, the third, the fourth, or the fifth possible implementation of the second aspect, in a sixth possible implementation of the second aspect, after the receiving, by the terminal device in the $i^{th}$ first period, a paging message that carries the first modification indication and that is sent by the network device, the method further includes:

updating, by the terminal device, the second-type system information in the $(i+1)^{th}$ first period if the first modification indication is used to indicate that the first-type system information sent in the next first period is to be modified or if the first modification indication is used to indicate that any system information sent in the next MP is to be modified, where the second-type system information includes other system information than the first-type system information; or updating, by the terminal device, the second-type system information in the next MP if the first modification indication is used to indicate that the first-type system information sent in the next first period is to be modified or if the first modification indication is used to indicate that any system information sent in the next MP is to be modified, where the second-type system information includes other system information than the first-type system information.

In addition to the first-type system information, the terminal device may further update the second-type system information, so that all system information can be updated in a more timely manner.

With reference to the sixth possible implementation of the second aspect, in a seventh possible implementation of the second aspect, before the updating, by the terminal device, second-type system information, the method further includes:

determining, by the terminal device, that the paging message further carries a second modification indication, where the second modification indication is used to indicate that the second-type system information sent in the next MP or the next first period is to be modified.

The paging message may carry the second modification indication. The second modification indication is used to indicate a modification status of the second-type system information. In this way, the terminal device may determine, based on a status indicated by the second modification indication, whether to update the second-type system information. If the second modification indication is used to indicate that second-type system information sent in the next MP or the next first period is not to be modified, the terminal device may not need to update the second-type system information, thereby reducing load of the terminal device.

With reference to the first possible implementation of the second aspect, in an eighth possible implementation of the second aspect, if the DRX cycle is greater than the first period, before the receiving, by a terminal device in an $i^{th}$ first period, a first message sent by a network device, the method further includes:

determining, by the terminal device, a frame number of a superframe at the beginning of the $i^{th}$ first period; and the receiving, by a terminal device in an $i^{th}$ first period, a first message sent by a network device includes:

determining, by the terminal device based on the frame number, a location of a first system message sent by the network device in the superframe, and reading, at the location, the first system message carrying the first modification indication.

If the DRX cycle is greater than the first period, the terminal device can determine the frame number of the superframe at the beginning of the $i^{th}$ first period. The terminal device may wake up in advance before the superframe, to read the first system message, thereby avoiding missing the first system message.

With reference to the first possible implementation of the second aspect, in a ninth possible implementation of the second aspect, if the DRX cycle is greater than the first period, before the receiving, by a terminal device in an $i^{th}$ first period, a first message sent by a network device, the method further includes:

determining, by the terminal device, a frame number of a radio frame at the beginning of the $i^{th}$ first period; and the receiving, by a terminal device in an $i^{th}$ first period, a first message sent by a network device includes:

determining, by the terminal device based on the frame number, a location of a first system message sent by the network device in the radio frame, and reading, at the location, the first system message carrying the first modification indication.

If the DRX cycle is greater than the first period, the terminal device can determine the frame number of the radio frame at the beginning of the $i^{th}$ first period. The terminal device may wake up in advance before the radio frame, to read the first system message, thereby avoiding missing the first system message.

With reference to the eighth or the ninth possible implementation of the second aspect, in a tenth possible implementation of the second aspect, the method further includes:

detecting, by the terminal device, whether the first-type system information has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message, where the system information includes the first-type system information and the second-type system information, and the second-type system information includes other system information than the first-type system information; and updating, by the terminal device, the first-type system information if the first-type system information has been modified.

Regardless of what is indicated by the first modification indication, provided that the first modification indication is used to indicate that a modification is to be performed, the terminal device can detect whether the first-type system information has been modified, and update the first-type system information if the first-type system information has been modified, thereby ensuring as much as possible that the first-type system information can be updated in a more timely manner.

With reference to the tenth possible implementation of the second aspect, in an eleventh possible implementation of the second aspect, the method further includes:

detecting, by the terminal device, whether second-type system information different from the first system message has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message; and updating, by the terminal device, the second-type system information different from the first system message, if the second-type system information different from the first system message has been modified.

Regardless of what is indicated by the first modification indication, provided that the first modification indication is used to indicate that a modification is to be performed, the terminal device can detect whether the second-type system information has been modified, and update the second-type system information if the second-type system information has been modified, thereby ensuring as much as possible that all system information can be updated in a more timely manner.

With reference to the eighth or the ninth possible implementation of the second aspect, in a twelfth possible implementation of the second aspect, the method further includes:

determining, by the terminal device, that the first system message further carries a second modification indication;

detecting, by the terminal device, whether the first-type system information has been modified if the second modification indication is used to indicate that first-type system information currently sent by the network device has been modified relative to first-type system information sent by the network device in a previous first period; and updating, by the terminal device, the first-type system information if the first-type system information has been modified.

The first system message may further carry the second modification indication. The second modification indication is used to specially indicate a modification status of the first-type system information, to make a clearer indication to the terminal device, thereby ensuring that the first-type system information can be updated in a more timely manner.

With reference to the twelfth possible implementation of the second aspect, in a thirteenth possible implementation of the second aspect, the method further includes:

detecting, by the terminal device, whether second-type system information different from the first system message has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message; and updating, by the terminal device, the second-type system information different from the first system message, if the second-type system information different from the first system message has been modified.

If the first system message carries the first modification indication and the second modification indication, the terminal device may determine, based on a status indicated by the first modification indication, whether the second-type system information needs to be updated, and determine, based on a status indicated by the second modification indication, whether the first-type system information needs to be updated. An indication effect is better by using the two modification indications.

With reference to any one of the second aspect or the first to the thirteenth possible implementations of the second aspect, in a fourteenth possible implementation, the method further includes:

reading, by the terminal device before establishing an RRC connection to the network device, the first system message sent by the network device; and updating, by the terminal device, system information different from the first system message, if the first modification indication carried in the first system message is used to indicate that the system information, currently sent by the network device, other than the first system message has been modified relative to the system information, stored in the terminal device, other than the first system message, where the system information includes the first-type system information and the second-type system information, and the second-type system information includes other system information than the first-type system information.

Before establishing the RRC connection to the network device, the terminal device may determine, based on the first modification indication carried in the first system message, whether to update the corresponding system information, thereby ensuring as much as possible that the terminal device updates the system information in time.

With reference to the fourteenth possible implementation of the second aspect, in a fifteenth possible implementation of the second aspect, the method further includes:

establishing, by the terminal device based on the updated system information, the RRC connection to the network device.

The terminal device may establish, based on the updated system information, the RRC connection to the network device, thereby ensuring an establishment success rate as much as possible.

With reference to any one of the second aspect or the first to the thirteenth possible implementations of the second aspect, in a sixteenth possible implementation, the method further includes:

reading, by the terminal device before establishing an RRC connection to the network device, the first system message sent by the network device; and updating, by the terminal device, the second-type system information different from the first system message, if the first modification indication carried in the first system message is used to indicate that the second-type system information, currently sent by the network device, other than the first system message has been modified relative to the second-type system information, stored in the terminal device, other than the first system message, where the system information includes the first-type system information and the second-type system information, and the second-type system information includes other system information than the first-type system information.

The first modification indication carried in the first system message may also be used to indicate a modification status of the second-type system information, so that the terminal device can reduce a range of system information that needs to be updated, thereby obtaining a better indication effect for the terminal device.

With reference to the sixteenth possible implementation of the second aspect, in a seventeenth possible implementation of the second aspect, the method further includes:

determining, by the terminal device, that the first system message further carries the second modification indication; and updating, by the terminal device, the first-type system information if the second modification indication is used to indicate that the first-type system information currently sent by the network device has been modified relative to the first-type system information sent by the network device in the previous first period.

The first system message may further carry the second modification indication. The second modification indication is used to indicate a modification status of the first-type system information. The terminal device can perform more explicit update by using the two modification indications that respectively indicate the modification statuses of the first-type system information and the second-type system information. An indication effect is better.

With reference to the seventeenth possible implementation of the second aspect, in an eighteenth possible implementation of the second aspect, the method further includes:

establishing, by the terminal device based on the updated system information, the RRC connection to the network device.

The terminal device may establish, based on the updated system information, the RRC connection to the network device, thereby ensuring an establishment success rate as much as possible.

According to a third aspect, another system information sending method is provided, including:

sending, by a network device, first-type system information to a terminal device based on an MP, where content of the first-type system information sent by the network device remains unchanged in predetermined duration.

The network device can continue sending the first-type system information to the terminal device based on the MP. Provided that it ensures that the content of the first-type system information sent remains unchanged in the predetermined duration, the terminal device can receive the first-type system information in time.

According to a fourth aspect, a network device is provided, including:

a sending unit, configured to send, based on a first period, first-type system information to a terminal device, where content of the first-type system information sent by the network device remains unchanged in one first period, and the first period is a maximum discontinuous reception DRX cycle that can be configured for the terminal device, or the first period is a modification period set by the network device for the first-type system information.

With reference to the fourth aspect, in a first possible implementation of the fourth aspect, the sending unit is further configured to:

send a paging message to the terminal device in an $i^{th}$ first period, where a DRX cycle of the terminal device is less than or equal to the first period, the paging message carries a first modification indication; the first modification indication is used to indicate whether first-type system information sent in a next first period is to be modified, or the first modification indication is used to indicate whether any system information sent in a next modification period MP is to be modified; and i is a positive integer.

With reference to the first possible implementation of the fourth aspect, in a second possible implementation of the fourth aspect, the paging message further carries a second modification indication, the second modification indication is used to indicate whether second-type system information sent in the next MP or the next first period is to be modified, and the second-type system information includes other system information than the first-type system information.

With reference to the first possible implementation of the fourth aspect, in a third possible implementation of the fourth aspect, the sending unit is further configured to:

send a paging message to the terminal device in an $i^{th}$ first period, where a DRX cycle of the terminal device is less than or equal to the MP and less than or equal to the first period; the paging message carries a first modification indication; the first modification indication is used to indicate whether first-type system information sent in a next first period is to be modified, or the first modification indication is used to indicate whether any system information sent in a next modification period MP is to be modified; and i is a positive integer.

With reference to the first possible implementation of the fourth aspect, in a fourth possible implementation of the fourth aspect, the sending unit is further configured to:

send a paging message to the terminal device in an $i^{th}$ first period, where a DRX cycle of the terminal device is greater than the MP and less than or equal to the first period; the paging message carries a first modification indication; the first modification indication is used to indicate whether first-type system information sent in a next first period is to be modified; and i is a positive integer.

With reference to the fourth possible implementation of the fourth aspect, in a fifth possible implementation of the fourth aspect, the paging message further carries a second modification indication, the second modification indication is used to indicate whether second-type system information sent in a next MP or the next first period is to be modified, and the second-type system information includes other system information than the first-type system information.

With reference to the fourth aspect, in a sixth possible implementation of the fourth aspect, the sending unit is further configured to:

send a first system message in an $i^{th}$ first period, where the first system message carries a first modification indication; where the first modification indication is used to indicate whether other system information currently sent by the network device than the first system message has been modified relative to other system information stored in the terminal device than the first system message, or the first modification indication is used to indicate whether second-type system information, currently sent by the network device, other than the first system message has been modified relative to second-type system information, stored in the terminal device, other than the first system message; and the second-type system information includes other system information than the first-type system information, and i is a positive integer.

With reference to the sixth possible implementation of the fourth aspect, in a seventh possible implementation of the fourth aspect, the first system message further carries a second modification indication, and the second modification indication is used to indicate whether the first-type system information currently sent by the network device has been modified relative to first-type system information sent by the network device in a previous first period.

With reference to any one of the fourth aspect or the first to the seventh possible implementations of the fourth aspect, in an eighth possible implementation of the fourth aspect, the first-type system information includes paging configuration information.

With reference to the eighth possible implementation of the fourth aspect, in a ninth possible implementation of the fourth aspect, the paging configuration information includes at least one of PCCH configuration information, information about a time-frequency resource on which the paging message is located, a quantity of times that the paging message is repeatedly sent to the terminal device, a window length of a paging window, a short DRX cycle in the paging window, and a modification period reset for the first-type system information.

According to a fifth aspect, a terminal device is provided, including:

a receiving unit, configured to receive, in an $i^{th}$ first period, a first message sent by a network device, where the first message carries a first modification indication, the first period is a modification period set by the network device for first-type system information, and i is a positive integer; and a processing unit, configured to determine, based on the first modification indication, whether to update the first-type system information, where the first modification indication is used to indicate a modification status of the first-type system information or a modification status of any system information.

With reference to the fifth aspect, in a first possible implementation of the fifth aspect, the processing unit is further configured to:

determine that a DRX cycle configured for the terminal device is greater than an MP of second-type system information, and that the DRX cycle is greater than the first period; or determine that a DRX cycle configured for the terminal device is less than or equal to the first period.

With reference to the first possible implementation of the fifth aspect, in a second possible implementation of the fifth aspect, if the DRX cycle is less than or equal to the first period, the receiving unit is configured to:

receive, in the $i^{th}$ first period, a paging message that carries the first modification indication and that is sent by the network device; and the processing unit is configured to:

update the first-type system information in an $(i+1)^{th}$ first period if the first modification indication is used to indicate that first-type system information sent in a next first period is to be modified; or update the first-type system information in a next MP or an $(i+1)^{th}$ first period if the first modification indication is used to indicate that any system information sent in the next MP is to be modified.

With reference to the second possible implementation of the fifth aspect, in a third possible implementation of the fifth aspect, if the DRX cycle is less than or equal to the first period and less than or equal to the MP, the receiving unit is configured to:

receive, in the $i^{th}$ first period, a paging message that carries the first modification indication and that is sent by the network device; and the processing unit is configured to:

update the first-type system information in an $(i+1)^{th}$ first period if the first modification indication is used to indicate that first-type system information sent in a next first period is to be modified; or update the first-type system information in a next MP or an $(i+1)^{th}$ first period if the first modification indication is used to indicate that any system information sent in the next MP is to be modified.

With reference to the second possible implementation of the fifth aspect, in a fourth possible implementation of the fifth aspect, if the DRX cycle is less than or equal to the first period and greater than the MP, the receiving unit is configured to:

receive, in the $i^{th}$ first period, a paging message that carries the first modification indication and that is sent by the network device; and the processing unit is configured to:

update the first-type system information in an $(i+1)^{th}$ first period if the first modification indication is used to indicate that first-type system information sent in a next first period is to be modified; or update the first-type system information in a next MP or an $(i+1)^{th}$ first period if the first modification indication is used to indicate that any system information sent in the next MP is to be modified.

With reference to the second, the third, or the fourth possible implementation of the fifth aspect, in a fifth possible implementation of the fifth aspect, the processing unit is configured to:

determine a frame number of a superframe at the beginning of the $(i+1)^{th}$ first period; and update the first-type system information in the superframe based on the determined frame number; or determine a frame number of a radio frame at the beginning of the $(i+1)^{th}$ first period; and update the first-type system information in the radio frame based on the determined frame number.

With reference to the second, the third, the fourth, or the fifth possible implementation of the fifth aspect, in a sixth possible implementation of the fifth aspect, the processing unit is further configured to:

after the receiving unit receives, in the $i^{th}$ first period, the paging message that carries the first modification indication and that is sent by the network device, update the second-type system information in the $(i+1)^{th}$ first period if the first modification indication is used to indicate that the first-type system information sent in the next first period is to be modified or if the first modification indication is used to indicate that any system information sent in the next MP is to be modified, where the second-type system information includes other system information than the first-type system information; or after the receiving unit receives, in the $i^{th}$ first period, the paging message that carries the first modification indication and that is sent by the network device, update the second-type system information in the next MP if the first modification indication is used to indicate that the first-type system information sent in the next first period is to be modified or if the first modification indication is used to indicate that any system information sent in the next MP is to be modified, where the second-type system information includes other system information than the first-type system information.

With reference to the sixth possible implementation of the fifth aspect, in a seventh possible implementation of the fifth aspect, the processing unit is further configured to:

before updating the second-type system information, determine that the paging message further carries a second modification indication, where the second modification indication is used to indicate that the second-type system information sent in the next MP or the next first period is to be modified.

With reference to the first possible implementation of the fifth aspect, in an eighth possible implementation of the fifth aspect, if the DRX cycle is greater than the first period, the processing unit is further configured to: before the receiving unit receives, in the $i^{th}$ first period, the first message sent by the network device, determine a frame number of a superframe at the beginning of the $i^{th}$ first period, and determine, based on the frame number, a location of a first system message sent by the network device in the superframe; and the receiving unit is configured to read, at the location, the first system message carrying the first modification indication.

With reference to the first possible implementation of the fifth aspect, in a ninth possible implementation of the fifth aspect, if the DRX cycle is greater than the first period, the processing unit is further configured to: before the receiving unit receives, in the $i^{th}$ first period, the first message sent by the network device, determine a frame number of a radio frame at the beginning of the $i^{th}$ first period, and determine, based on the frame number, a location of a first system message sent by the network device in the radio frame; and the receiving unit is configured to read, at the location, the first system message carrying the first modification indication.

With reference to the eighth or the ninth possible implementation of the fifth aspect, in a tenth possible implementation of the fifth aspect, the processing unit is further configured to:

detect whether the first-type system information has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message, where the system information includes the first-type system information and the second-type system information, and the second-type system information includes other system information than the first-type system information; and update the first-type system information if the first-type system information has been modified.

With reference to the tenth possible implementation of the fifth aspect, in an eleventh possible implementation of the fifth aspect, the processing unit is further configured to:

detect whether second-type system information different from the first system message has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message; and update the second-type system information different from the first system message, if the second-type system information different from the first system message has been modified.

With reference to the eighth or the ninth possible implementation of the fifth aspect, in a twelfth possible implementation of the fifth aspect, the processing unit is further configured to:

determine that the first system message further carries a second modification indication;

detect whether the first-type system information has been modified if the second modification indication is used to indicate that first-type system information currently sent by the network device has been modified relative to first-type system information sent by the network device in a previous first period; and update the first-type system information if the first-type system information has been modified.

With reference to the twelfth possible implementation of the fifth aspect, in a thirteenth possible implementation of the fifth aspect, the processing unit is further configured to:

detect whether second-type system information different from the first system message has been modified if the first modification indication is used to indicate that other system information currently sent by the network device than the first system message has been modified relative to other system information stored in the terminal device than the first system message or if the first modification indication is used to indicate that second-type system information, currently sent by the network device, other than the first system message has been modified relative to second-type system information, stored in the terminal device, other than the first system message; and update the second-type system information different from the first system message, if the second-type system information different from the first system message has been modified.

With reference to any one of the fifth aspect or the first to the thirteenth possible implementations of the fifth aspect, in a fourteenth possible implementation of the fifth aspect, the receiving unit is further configured to read, before establishing an RRC connection to the network device, the first system message sent by the network device; and the processing unit is further configured to update system information different from the first system message, if the first modification indication carried in the first system message is used to indicate that the system information, currently sent by the network device, other than the first system message has been modified relative to the system information, stored in the terminal device, other than the first system message, where the system information includes the first-type system information and the second-type system information, and the second-type system information includes other system information than the first-type system information.

With reference to the fourteenth possible implementation of the fifth aspect, in a fifteenth possible implementation of the fifth aspect, the processing unit is further configured to:

establish, based on the updated system information, the RRC connection to the network device.

With reference to any one of the fifth aspect or the first to the thirteenth possible implementations of the fifth aspect, in a sixteenth possible implementation of the fifth aspect, the receiving unit is further configured to read, before establishing an RRC connection to the network device, the first system message sent by the network device; and the processing unit is further configured to update the second-type system information different from the first system message, if the first modification indication carried in the first system message is used to indicate that the second-type system information, currently sent by the network device, other than the first system message has been modified relative to the second-type system information, stored in the terminal device, other than the first system message, where the system information includes the first-type system information and the second-type system information, and the second-type system information includes other system information than the first-type system information.

With reference to the sixteenth possible implementation of the fifth aspect, in a seventeenth possible implementation of the fifth aspect, the processing unit is further configured to:

determine that the first system message further carries the second modification indication; and update the first-type system information if the second modification indication is used to indicate that first-type system information currently sent by the network device has been modified relative to the first-type system information sent by the network device in the previous first period.

With reference to the seventeenth possible implementation of the fifth aspect, in an eighteenth possible implementation of the fifth aspect, the processing unit is further configured to:

establish, based on the updated system information, the RRC connection to the network device.

According to a sixth aspect, another network device is provided, including:

a sending unit, configured to send first-type system information to a terminal device based on an MP, where content of the first-type system information sent by the network device remains unchanged in predetermined duration.

DESCRIPTION OF EMBODIMENTS

Technologies described in this specification may be applied to various communications systems, for example, an LTE system, a fifth-generation mobile communications system (5G), and other such communications systems.

For example, as a constituent part of 5G, a market requirement of the Internet of Things (IoT) grows rapidly. The 3rd Generation Partnership Project (3GPP) is currently studying how to make full use of features of a narrowband technology to carry an IoT service by designing a new air interface based on a cellular network. Such IoTs are referred to as narrowband Internet of Things (NB-IoT). Compared with a conventional cellular network, NB-IoT services generally have characteristics such as a low rate and a long arrival cycle. Compared with the conventional cellular network, the NB-IoT services generate smaller data packets, and are usually insensitive to a time delay. In addition, the NB-IoT usually requires lower power consumption of a terminal device. This saves battery power of the terminal device, and ensures an ultra long standby time of the terminal device, thereby reducing manpower costs for battery replacement. Under these premises, there may be some changes in a terminal device in the NB-IoT. For example, for the characteristics such as the low rate and the long arrival cycle of the NB-IoT services, a relatively long DRX cycle may be used for a terminal device in a radio resource control idle (RRC IDLE) state, thereby reducing unnecessary PDCCH listening on the terminal device, saving power, and prolonging a standby time of the terminal device as much as possible.

Figure 1:
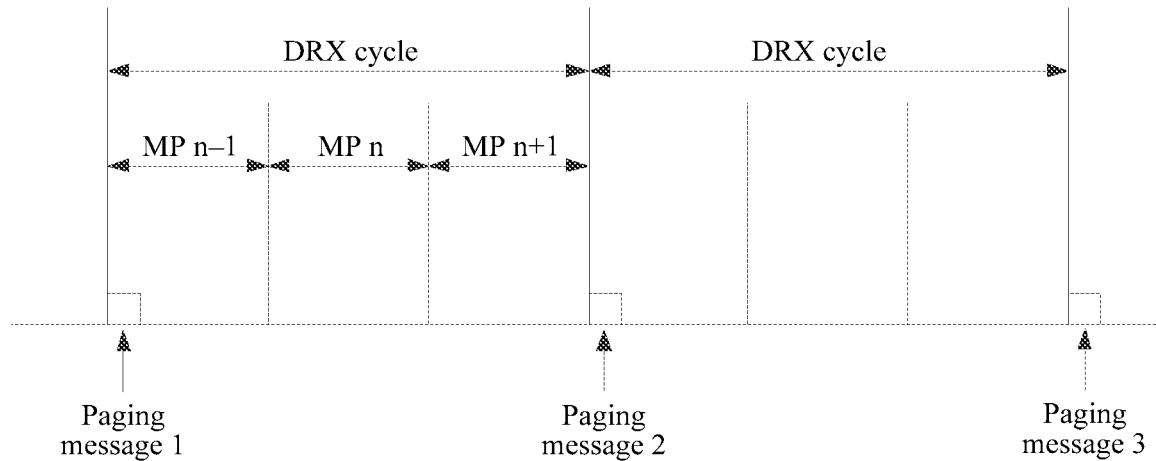
FIG. 1 is a schematic diagram of a process of updating paging configuration information in LTE.

However, in the NB-IoT, due to the relatively long DRX cycle, it is quite possible that a paging period (usually, the paging period is approximately equal to the DRX cycle) is greater than a modification period (MP) of system information. Before the terminal device receives a paging message used to notify that system information is to be modified, the system information may be already modified. If the modified system information includes paging configuration information, it cannot be ensured that the terminal device can successfully receive the system information after waking up when the DRX cycle comes. If the terminal device cannot receive the system information, the terminal device cannot receive a subsequent paging message. Consequently, the problem in FIG. 1 arises. Therefore, apparently, the technical solutions in the embodiments of the present disclosure have relatively obvious advantages when applied to the NB-IoT. Certainly, in addition to the NB-IoT, the technical solutions in the embodiments of the present disclosure may further be applied to another network system such as an LTE system.

In the following, some terms in the embodiments of the present disclosure are described, to help a person skilled in the art have a better understanding.

(1) A terminal device is a device that provides voice and/or data connectivity to a user, for example, may be a handheld device with a wireless connection function or a processing device connected to a wireless modem. The terminal device may communicate with a core network by using a radio access network (RAN), and exchange voice and/or data with the RAN. The terminal device may include UE, a wireless terminal device, a mobile terminal device, a subscriber unit, a subscriber station, a mobile station, a mobile, a remote station, an access point (AP), a remote terminal device, an access terminal device, a user terminal device, a user agent, a user device, or the like. For example, the terminal device may include a mobile phone (or referred to as a "cellular" phone), a computer with a mobile terminal device, a special terminal device in the NB-IoT, and a portable, pocket-sized, handheld, computer built-in, or in-vehicle mobile apparatus. For example, the terminal device may be a device such as a personal communications service (PCS) phone, a cordless telephone, a Session Initiation Protocol (SIP) phone, a wireless local loop (WLL) station, or a personal digital assistant (PDA).

(2) A network device is, for example, a base station (for example, an access point), and may be specifically a device in communication with a wireless terminal device by using one or more sectors over an air interface in an access network. The base station may be configured to: convert a received over-the-air frame into an Internet Protocol (IP) packet or vice versa, and serve as a router between the wireless terminal device and a remaining part of the access network. The remaining part of the access network may include an IP network. The base station may further coordinate attribute management of the air interface. For example, the base station may be an evolved NodeB (NodeB, eNB, or e-NodeB, evolved NodeB) in an LTE-Advanced system (LTE-A). This is not limited in the embodiments of the present disclosure.

(3) In the embodiments of the present disclosure, based on content division, system information may include first-type system information and second-type system information.

The first-type system information may include paging configuration information and other system information that the terminal device needs to obtain in time. The paging configuration information may include paging-related system information, for example, may include at least one of paging control channel (PCCH) configuration information, information about a time-frequency resource on which a paging message is located, a quantity of times that the paging message is repeatedly sent to the terminal device, a window length of a paging window, a short DRX cycle in the paging window, and a modification period reset for the first-type system information. Certainly, the paging configuration information may further include other possible paging-related system information.

The second-type system information may include other system information than the first-type system information.

(4) In the embodiments of the present disclosure, a first system message may include, for example, a master information block (MIB) message and/or a system information block (SIB) message, and may further include another possible system message. The SIB message may include, for example, a SIB1 message, and certainly, may further include another SIB message.

(5) The terms "system" and "network" may be used interchangeably in the embodiments of the present disclosure. "A plurality of" means two or more than two. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise.

The following further describes the embodiments of the present disclosure in detail with reference to this specification.

Figure 2:
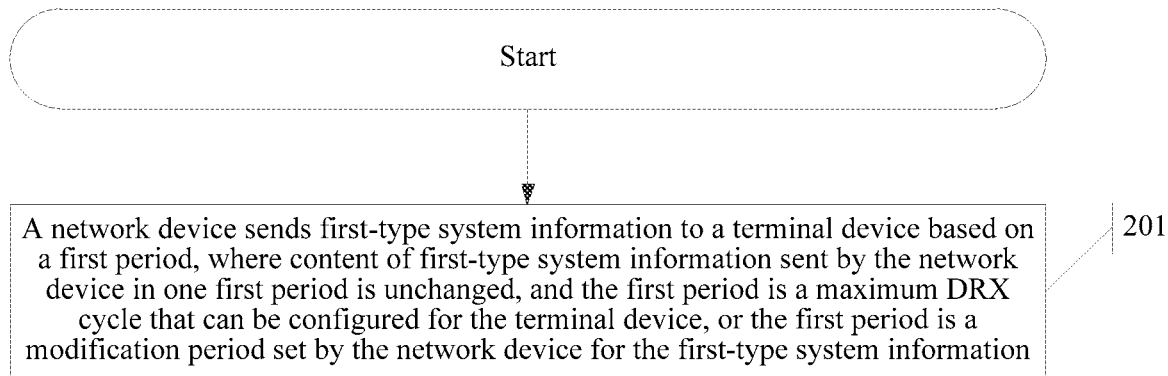
FIG. 2 is a flowchart of a first system information sending method according to an embodiment of the present disclosure.

Referring to FIG. 2, a first system information sending method is provided. A procedure of the method is described as follows:

Step 201: A network device sends, based on a first period, first-type system information to a terminal device, where content of the first-type system information sent by the network device remains unchanged in one first period, and the first period is a maximum DRX cycle that can be configured for the terminal device, or the first period is a modification period set by the network device for the first-type system information.

Figure 3:
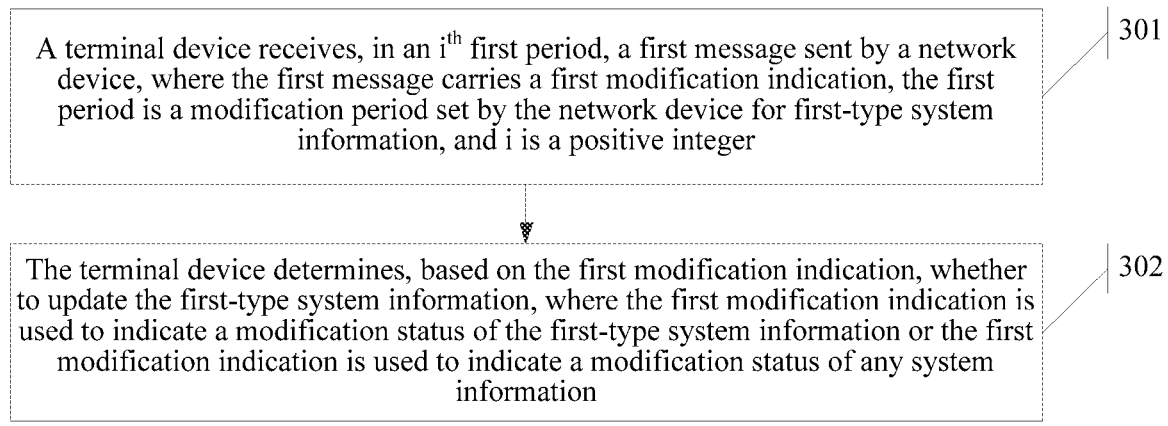
FIG. 3 is a flowchart of a system information update method according to an embodiment of the present disclosure.

Referring to FIG. 3, based on a same inventive concept, a system information update method is provided. A procedure of the method is described as follows:

Step 301: A terminal device receives, in an $i^{th}$ first period, a first message sent by a network device, where the first message carries a first modification indication, the first period is a modification period set by the network device for first-type system information, and i is a positive integer.

Step 302: The terminal device determines, based on the first modification indication, whether to update the first-type system information, where the first modification indication is used to indicate a modification status of the first-type system information or the first modification indication is used to indicate a modification status of any system information.

Figure 4:
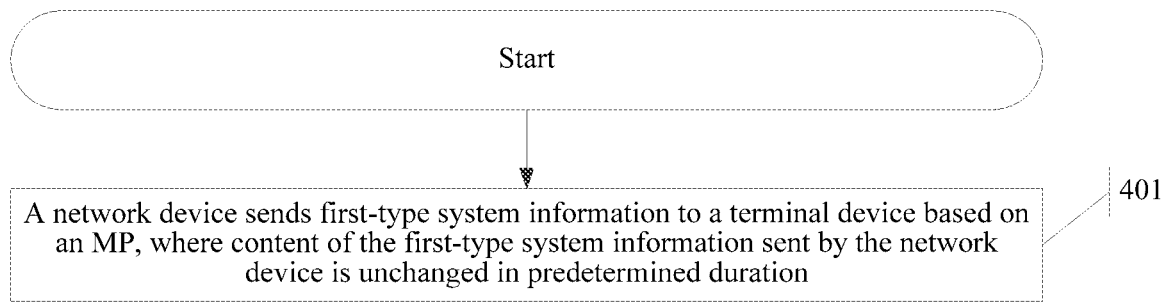
FIG. 4 is a flowchart of a second system information sending method according to an embodiment of the present disclosure.

Referring to FIG. 4, based on the same inventive concept, a second system information sending method is provided. A procedure of the method is described as follows:

Step 401: A network device sends first-type system information to a terminal device based on an MP, where content of the first-type system information sent by the network device remains unchanged in predetermined duration.

Optionally, the predetermined duration may be an integer multiple of a DRX cycle defaulted by the network device or an integer multiple of the MP. For example, the predetermined duration may be a maximum DRX cycle that can be configured for the terminal device. There may be any relationship between values of the predetermined duration and the MP.

Methods in FIG. 2, FIG. 3, and FIG. 4 are corresponding methods, and are described below together.

Optionally, the first period may be an integer multiple of the DRX cycle defaulted by the network device or an integer multiple of the MP.

If the first period is the maximum DRX cycle that can be configured for the terminal device, it can be ensured that when the DRX cycle of the terminal device is greater than the MP, the modification status of the first-type system information (for example, including paging configuration information) can still be reliably obtained in time, thereby updating the paging configuration information in time and avoiding missing a subsequent paging message. However, a relatively substantial limitation may be imposed on this manner during implementation. Therefore, a case in which the first period is the modification period set by the network device for the first-type system information is mainly described below.

Based on a relationship among values of a DRX cycle, an MP, and a first period, descriptions are provided based on the following several cases. A terminal device is configured with a DRX cycle, and reports the DRX cycle to a core network device. The core network device may deliver the DRX cycle to a network device (a base station is used as an example of the network device in the embodiments of the present disclosure). The network device configures an MP, and may further configure a first period when needed (that is, when the DRX cycle is greater than the MP). The network device may notify the terminal device of the MP and the first period.

Case 1: The DRX cycle configured for the terminal device is less than or equal to the first period.

Optionally, in this case, the DRX cycle may be less than or equal to an MP of second-type system information, or may be greater than an MP.

Figure 5:
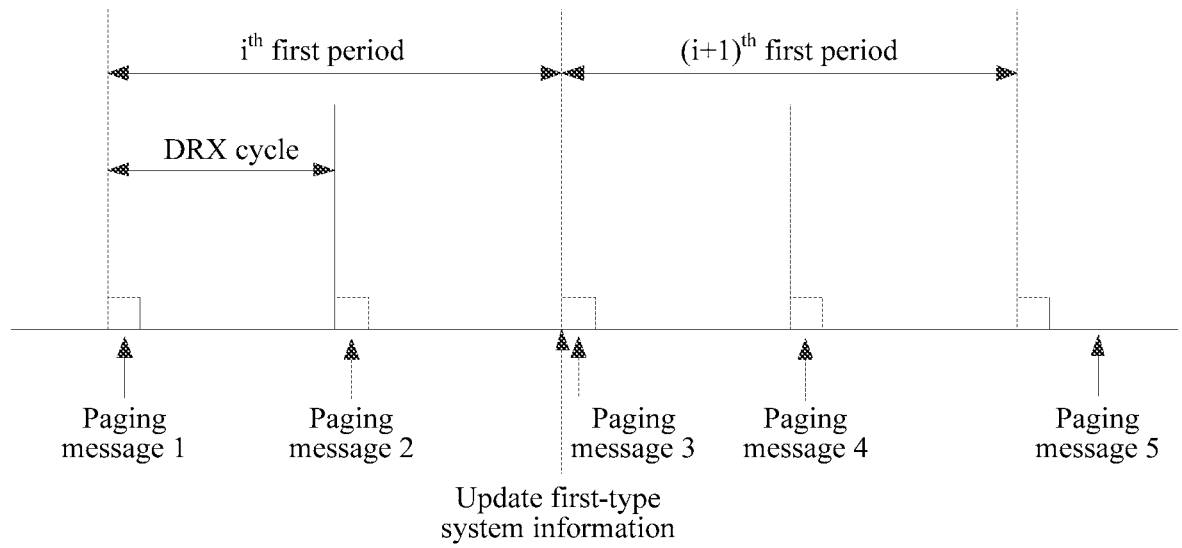
FIG. 5 and FIG. 6 are several schematic diagrams of a system information update process according to an embodiment of the present disclosure.

In this case, the network device may send a paging message to the terminal device. For example, referring to FIG. 5, the network device sends, in an $i^{th}$ first period, a paging message to the terminal device (this only means that some paging messages sent by the network device fall in the $i^{th}$ first period, but does not mean that a paging period is the first period, and usually, the paging period may be approximately equal to the DRX cycle), for example, a paging message represented by a small block in FIG. 5, where i is a positive integer. The network device needs to ensure that first-type system information remains unchanged in the first period, and if the first-type system information is to be modified, the network device needs to notify the terminal device in a previous first period. In an example in which the first-type system information includes paging configuration information, if the paging configuration information is to be modified in an $(i+1)^{th}$ first period, a modification status of the paging configuration information needs to be notified of by using a paging message sent by the network device in the $i^{th}$ first period.

Optionally, the paging message sent in the $i^{th}$ first period may carry a first modification indication. The first modification indication may be used to indicate whether first-type system information sent in a next first period is to be modified, or the first modification indication may be used to indicate whether any system information sent in a next MP is to be modified. For example, the first modification indication may occupy one bit (bit). For example, if a value of the first modification indication is "0", it indicates that the first-type system information sent in the next first period is not to be modified, or it indicates that any system information sent in the next MP is not to be modified. If a value of the first modification indication is "1", it indicates that the first-type system information sent in the next first period is to be modified, or it indicates that any system information sent in the next MP is to be modified. In an example of FIG. 5, the terminal device may receive a paging message 1 and a paging message 2 in the $i^{th}$ first period, where the paging message 1 is received before the terminal device enters a DRX cycle, and the paging message 2 is received after the terminal device wakes up from the DRX cycle. For example, the first-type system information is to be modified in the $(i+1)^{th}$ first period. Therefore, if values of first modification indications carried in the paging message 1 and the paging message 2 are both "1", the terminal device determines that the first-type system information is to be modified in the next first period, or determines that any system information sent in the next MP is to be modified. In this case, the terminal device may update the first-type system information in the $(i+1)^{th}$ first period.

Optionally, the first modification indication may be used to indicate whether any system information sent in a next MP is to be modified. For example, the first modification indication occupies one bit. In this case, a value of the first modification indication may be "1" provided that at least one type of system information has been modified. To be specific, this is a manner of uniform indication instead of uniquely indicating a type of system information that has been modified.

Optionally, if the terminal device determines, based on the first modification indication carried in the paging message, that the first-type system information in the next first period is to be modified or that any system information sent in the next MP is to be modified, the terminal device may determine a frame number of a superframe at the beginning of the $(i+1)^{th}$ first period. The terminal device may update, based on the determined frame number, the first-type system information in the superframe, for example, may update the first-type system information at a boundary at the beginning of the $(i+1)^{th}$ first period shown in FIG. 5. In this way, the terminal device can normally receive a subsequent paging message 3, paging message 4, and paging message 5. The terminal device can receive the first-type system information at a relatively accurate location by determining the frame number.

Optionally, the terminal device may determine the frame number of the superframe at the beginning of the $(i+1)^{th}$ first period according to the following formula:

$$H\text{-}SFN \bmod P\text{-}MP = 0 \tag{1}$$

In the formula (1), H-SFN represents the number of the superframe, P-MP represents the first period, and mod represents a remainder operation.

Optionally, if the terminal device determines, based on the first modification indication carried in the paging message, that the first-type system information in the next first period is to be modified or that any system information sent in the next MP is to be modified, the terminal device may determine a frame number of a radio frame at the beginning of the $(i+1)^{th}$ first period. The terminal device may update, based on the determined frame number, the first-type system information in the radio frame, for example, may update the first-type system information at a boundary at the beginning of the $(i+1)^{th}$ first period shown in FIG. 5. In this way, the terminal device can normally receive a subsequent paging message 3, paging message 4, and paging message 5. The terminal device can receive the first-type system information at a relatively accurate location by determining the frame number.

Optionally, both the first-type system information and the second-type system information belong to the system information. If the first-type system information is modified, the second-type system information may also be modified. In this case, to obtain latest system information as much as possible, if the terminal device determines that the first-type system information in the next first period is to be modified or that any system information sent in the next MP is to be modified, in addition to the first-type system information, the terminal device may further update the second-type system information in the $(i+1)^{th}$ period or update the second-type system information in the next MP. For example, the terminal device receives the paging message in one MP, and may update the second-type system information in a next MP.

Optionally, if the terminal device is to update the second-type system information in the $(i+1)^{th}$ period, the terminal device may determine the frame number of the superframe at the beginning of the $(i+1)^{th}$ first period. That is, after determining the frame number of the superframe, the terminal device may further update the second-type system information in the superframe in addition to updating the first-type system information in the superframe.

Optionally, if the terminal device is to update the second-type system information in the $(i+1)^{th}$ period, the terminal device may determine the frame number of the radio frame at the beginning of the $(i+1)^{th}$ first period. That is, after determining the frame number of the radio frame, the terminal device may further update the second-type system information in the radio frame in addition to updating the first-type system information in the radio frame.

Optionally, in addition to the first modification indication, the paging message may further carry a second modification indication. The second modification indication may be used to indicate whether second-type system information sent in a next MP or a next first period is to be modified. The second modification indication may also occupy, for example, one bit. If a value of the second modification indication is "0", it indicates that the second-type system information sent in the next MP or the next first period is not to be modified. If a value of the second modification indication is "1", it indicates that the second-type system information sent in the next MP or the next first period is to be modified. In this case, the terminal device may update the second-type system information in the next MP (for example, at a boundary at the beginning of the next MP) or the next first period.

If the paging message carries the first modification indication and the second modification indication, the terminal device may determine, based on the first modification indication, whether to update the first-type system information, and determine, based on the second modification indication, whether to update the second-type system information. For example, if the values of the first modification indication and the second modification indication are both "0", the terminal device determines that neither the first-type system information nor the second-type system information is to be modified, and the terminal device may not update the first-type system information and the second-type system information. If the values of the first modification indication and the second modification indication are both "1", the terminal device determines that the first-type system information is to be modified in the next first period (or determines that any system information sent in the next MP is to be modified), and that the second-type system information is to be modified in the next MP or the next first period, and the terminal device may update the first-type system information in the next first period, and update the second-type system information in the next MP or the next first period. If the value of the first modification indication is "0" and the value of the second modification indication is "1", the terminal device determines that the first-type system information is not to be modified in the next first period (or determines that any system information sent in the next MP is not to be modified), and that the second-type system information is to be modified in the next MP or the next first period, the terminal device may not update the first-type system information, and may update the second-type system information in the next MP or the next first period. If the value of the first modification indication is "1", and the value of the second modification indication is "0", the terminal device determines that the first-type system information is to be modified in the next first period (or determines that any system information sent in the next MP is to be modified), and that the second-type system information is not to be modified in the next MP or the next first period, and the terminal device may update the first-type system information in next first period, and may not update the second-type system information.

Modification statuses of the first-type system information and the second-type system information may be indicated respectively by using the first modification indication and the second modification indication. Indication is more accurate, and the terminal device may perform targeted update.

2. Case 2: The DRX cycle configured for the terminal device is greater than an MP of second-type system information, and the DRX cycle is greater than the first period.

In this case, the network device may send a first system message to the terminal device. For example, referring to FIG. 6, the network device sends, in an $i^{th}$ first period, a first system message to the terminal device (this only means that some first system messages sent by the network device fall in the $i^{th}$ first period, but does not mean that a period of sending a first system message is the first period), for example, a first system message to which an arrow is pointed in FIG. 6, where i is a positive integer. The network device needs to ensure that first-type system information remains unchanged in the first period.

The network device may send the first system message through broadcasting (or in another manner). Therefore, a time when the network device sends the first system message is independent of a relationship among the DRX cycle of the terminal device, the MP, and the first period. In the embodiments of the present disclosure. The first system message needs to be used only when the DRX cycle configured for the terminal device is greater than the MP of the second-type system information and the DRX cycle is greater than the first period.

Optionally, the first system message may carry a first modification indication. The first modification indication is used to indicate whether other system information currently sent by the network device than the first system message has been modified relative to other system information stored in the terminal device than the first system message, or the first modification indication is used to indicate whether second-type system information, currently sent by the network device, other than the first system message has been modified relative to second-type system information, stored in the terminal device, other than the first system message.

For example, if the first system message includes a MIB message, the first modification indication may be a system information identifier (systemInfoValueTag, VT) in the MIB message. If a value of systemInfoValueTag in the MIB message is different from a value of systemInfoValueTag stored in the terminal device, the terminal device determines that the other system information than the first system message has been modified, or determines that the second-type system information different from the first system message has been modified. If the value of systemInfoValueTag in the MIB message is the same as the value of systemInfoValueTag stored in the terminal device, the terminal device determines that the other system information than the first system message has not been modified, or determines that the second-type system information different from the first system message has not been modified. If the first system message is another message, the first modification indication may have another corresponding representation form. For example, the first modification indication may be represented by one bit.

For example, if the first system message includes a SIB1 message, the first modification indication may be used to indicate whether other system information than the SIB1 message and a MIB message has been modified.

Figure 6:
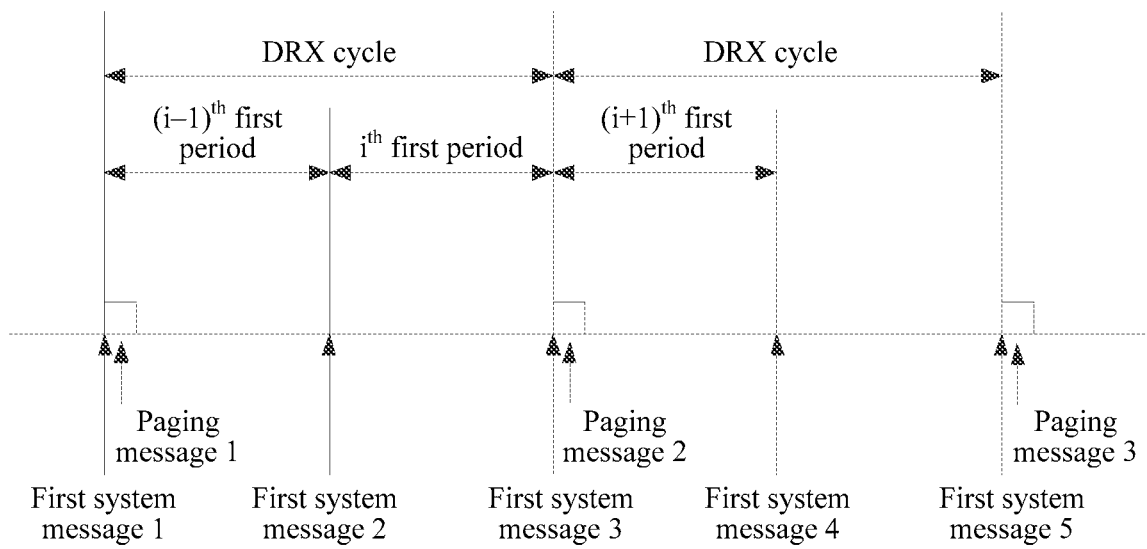

It should be noted that, in Case 1, the network device also sends a first system message, and in Case 2, the network device also sends a paging message (such as a paging message 1 and a paging message 2 shown by small blocks in FIG. 6).

Optionally, if the DRX cycle is greater than the first period, and the terminal device hibernates strictly based on the DRX cycle, some first system messages may be missed. If the first system messages indicate a modification of the first-type system information, the terminal device may miss a subsequent paging message. Therefore, if the DRX cycle is greater than the first period, the terminal device may first determine a frame number of a superframe at the beginning of the $i^{th}$ first period (or determines a frame number of a radio frame at the beginning of the $i^{th}$ first period), so that the terminal device may determine, based on the frame number, a location of a first system message sent by the network device in the superframe (or the radio frame). For example, the terminal device may wake up based on the determined location in the $i^{th}$ first period (or may wake up in advance), and read (or receive), at the location, the first system message carrying the first modification indication. Because the first-type system information remains unchanged in one first period, if the terminal device reads, in each first period, the first system message carrying the first modification indication, the terminal device may not miss modified first-type system information, thereby ensuring that a subsequent paging message can be normally received.

Optionally, the terminal device may calculate the number of the superframe still according to the formula (1).

Optionally, in an example of FIG. 6, the terminal device receives a first system message 1 at the beginning of a DRX cycle (which may be at the beginning of an $(i-1)^{th}$ first period in FIG. 6). For example, a first modification indication carried in the first system message 1 is used to indicate that other system information, currently sent by the network device, other than the first system message has not been modified relative to other system information stored in the terminal device, or is used to indicate that second-type system information, currently sent by the network device, other than the first system message has not been modified relative to second-type system information stored in the terminal device.

The terminal device enters the DRX cycle. Before entering the DRX cycle, which may alternatively be understood as before hibernation, the terminal device may determine a frame number of a superframe (or a frame number of a radio frame) at the beginning of the $i^{th}$ first period, so that the terminal device may determine, based on the frame number, a location of a first system message sent by the network device in the superframe (or the radio frame). The terminal device may wake up in advance in the $i^{th}$ first period based on the determined location, and read, at the determined location, a first system message carrying a first modification indication (e.g., read a first system message 2 shown in FIG. 6). For example, the first modification indication carried in the first system message 2 is used to indicate that other system information, currently sent by the network device, other than the first system message has not been modified relative to other system information stored in the terminal device, or is used to indicate that second-type system information, currently sent by the network device, other than the first system message has not been modified relative to second-type system information stored in the terminal device.

The terminal device continues the DRX cycle. In the example of FIG. 6, because the terminal device needs to wake up only once in one DRX cycle, the terminal device does not need to wake up again in the DRX cycle. (Because the first period may be set depending on a requirement, one DRX cycle of the terminal device may also include a plurality of first periods. In this case, the terminal device may need to wake up for a plurality of times, and wakeup manners are similar. Details are not further described.) At the end of the DRX cycle, which is alternatively understood as at the beginning of a next DRX cycle (which, in FIG. 6, is also a boundary at the end of the $i^{th}$ first period, or is alternatively understood as a boundary at the beginning of an $(i+1)^{th}$ first period), the terminal device may read the first system message carrying the first modification indication, namely, a first system message 3 shown in FIG. 6. For example, a first modification indication carried in the first system message 3 is used to indicate that other system information, currently sent by the network device, other than the first system message has been modified relative to other system information stored in the terminal device, or is used to indicate that second-type system information, currently sent by the network device, other than the first system message has been modified relative to second-type system information stored in the terminal device. In this case, the terminal device may detect whether first-type system information has been modified.

If determining that the first-type system information has been modified, the terminal device may update the first-type system information. Regardless of whether the second-type system information received by the terminal device through wakeup in advance or the first system message normally received by the terminal device, provided that the carried first modification indication is used to indicate whether other system information, currently sent by the network device, other than the first system message has been modified relative to other system information stored in the terminal device, or is used to indicate whether second-type system information, currently sent by the network device, other than the first system message has been modified relative to second-type system information stored in the terminal device, the terminal device can detect whether the first-type system information has been modified.

If determining that the first-type system information has been modified, the terminal device may immediately update the first-type system information. In this way, the terminal device can normally receive the subsequent paging message such as the paging message 2 and a paging message 3. Usually, after updating the first-type system information, the terminal device can continue the DRX cycle. The terminal device may continually read a subsequent first system message 4, first system message 5, and the like in a similar manner, and details are not further described.

Optionally, both the first-type system information and the second-type system information belong to the system information. If the first-type system information is modified, the second-type system information may also be modified. In this case, to obtain latest system information as much as possible, if the terminal device determines that the other system information currently sent by the network device than the first system message has been modified relative to the other system information stored in the terminal device than the first system message, or determines that the second-type system information, currently sent by the network device, other than the first system message has been modified relative to the second-type system information, stored in the terminal device, other than the first system message, in addition to detecting whether the first-type system information has been modified, the terminal device may further detect whether the second-type system information different from the first system message has been modified. If the second-type system information different from the first system message has been modified, the terminal device may immediately update the second-type system information different from the first system message.

Optionally, in addition to the first modification indication, the first system message may further carry a second modification indication. The second modification indication may be used to indicate whether the first-type system information, currently sent by the network device, has been modified relative to first-type system information sent by the network device in a previous first period. That is, the second modification indication may be used to specially indicate the first-type system information. This is because update of the first-type system information is related to whether a subsequent paging message can be normally received. Therefore, a better indication effect can be obtained by using the second modification indication to specially indicate the first-type system information.

Optionally, the second modification indication may occupy, for example, one bit. If a value of the second modification indication is "0", it indicates that the first-type system information currently sent by the network device has not been modified relative to first-type system information sent by the network device in a previous first period. If a value of the second modification indication is "1", it indicates that the first-type system information currently sent by the network device has been modified relative to first-type system information sent by the network device in a previous first period. In this case, the terminal device may immediately update the first-type system information.

If the first system message carries the first modification indication and the second modification indication, the terminal device may determine, based on the first modification indication, whether to update the second-type system information different from the first system message, and determine, based on the second modification indication, whether to update the first-type system information.

Optionally, the first modification indication may be carried in a MIB message or a SIB1 message, and the second modification indication may be carried in a MIB message or a SIB1 message. The first modification indication and the second modification indication may be carried in a same message. For example, both may be carried in a MIB message or a SIB1 message. Alternatively, the first modification indication and the second modification indication may be carried in different messages. For example, the first modification indication may be carried in a MIB message, and the second modification indication may be carried in a SIB1 message. Alternatively, the first modification indication may be carried in a SIB1 message, and the second modification indication may be carried in a MIB message.

Regardless of whether Case 1 or Case 2, before establishing an RRC connection to the network device, the terminal device can read the first system message sent by the network device.

Optionally, if the first modification indication carried in the first system message is used to indicate that the other system information currently sent by the network device than the first system message has been modified relative to the other system information stored in the terminal device than the first system message, the terminal device may update the system information different from the first system message, and the terminal device may establish the RRC connection to the network device based on the updated system information. In this way, it can further be ensured that the RRC connection can be established to the network device by using the updated first-type system information, thereby ensuring a success rate of RRC connection establishment.

Optionally, if the first modification indication carried in the first system message is used to indicate that the second-type system information, currently sent by the network device, other than the first system message has been modified relative to the second-type system information, stored in the terminal device, the terminal device may update the second-type system information different from the first system message. In this case, the first system message may further carry a second modification indication. The second modification indication may be used to indicate whether the first-type system information currently sent by the network device has been modified relative to first-type system information sent by the network device in a previous first period. If the second modification indication is used to indicate that the first-type system information currently sent by the network device has been modified relative to the first-type system information sent by the network device in the previous first period, the terminal device may update the first-type system information. The terminal device can establish the RRC connection to the network device based on the updated system information.

The following describes a device provided in the embodiments of the present disclosure with reference to the accompanying drawings.

Figure 7:
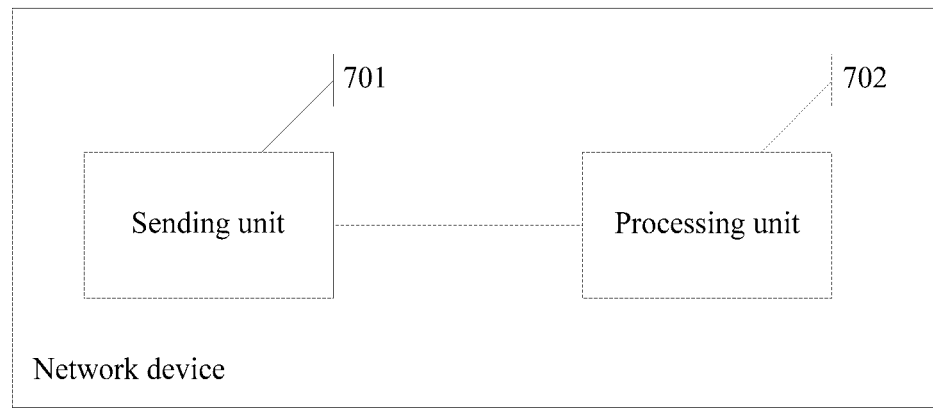
FIG. 7 is a structural block diagram of a network device according to an embodiment of the present disclosure.

Referring to FIG. 7, based on the same inventive concept, a network device is provided. The network device may include a sending unit 701. Optionally, the network device may further include a processing unit 702. For example, the processing unit 702 may be configured to set a first period for first-type system information.

The network device may be configured to perform the method in FIG. 2 to FIG. 6. Therefore, for functions implemented by the units in the network device, refer to the descriptions in the foregoing method part, and details are not further described.

Figure 8:
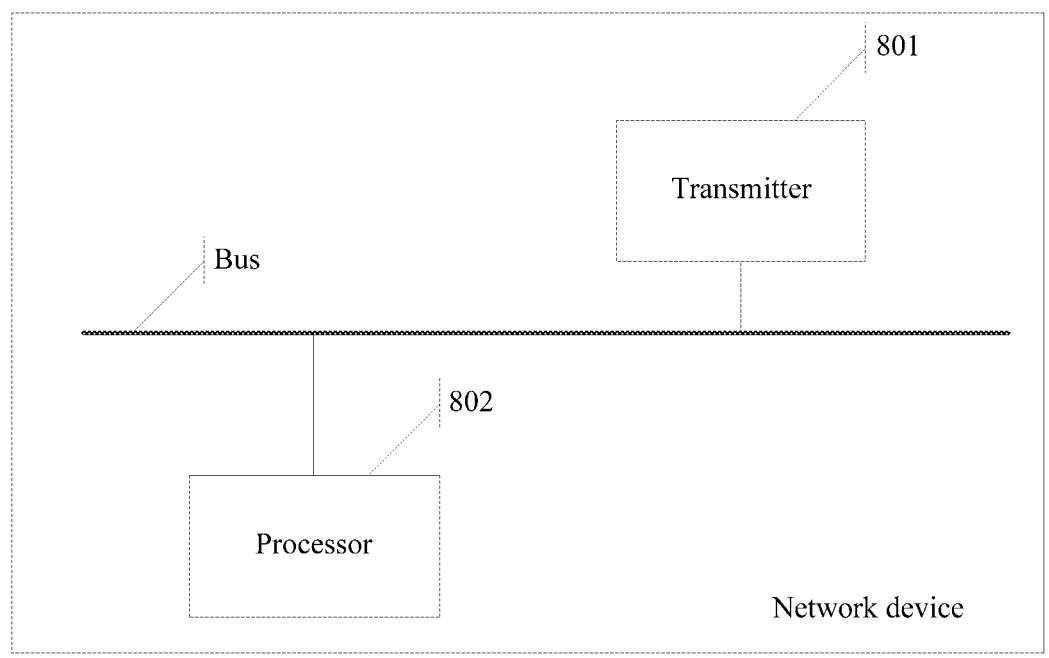
FIG. 8 is a structural block diagram of a terminal device according to an embodiment of the present disclosure.

Referring to FIG. 8, FIG. 8 is a schematic structural diagram of a possible entity of the network device shown in FIG. 7. In an actual application, a physical device corresponding to the sending unit 701 may be a transmitter 801, and a physical device corresponding to the processing unit 702 may be a processor 802.

The processor 802 may include, for example, a central processing unit (CPU) or an application-specific integrated circuit (ASIC), and may be one or more integrated circuits executed by a control program, a hardware circuit developed by using a field programmable gate array (FPGA), or a baseband chip.

The transmitter 801 is configured to perform network communication with an external device, for example, may communicate with the external device by using a network such as an Ethernet, a radio access network, or a wireless local area network.

The transmitter 801 may be connected to the processor 802 by using a bus (which is used as an example in FIG. 8), or may be connected to the processor 802 by using a special connection cable.

Code corresponding to the foregoing method is burned into a chip by designing and programming the processor 802, so that the chip can perform the foregoing method shown in FIG. 2 to FIG. 6 during operation. How to design and program the processor 802 is a technology known to a person skilled in the art, and details are not described herein.

Figure 9:
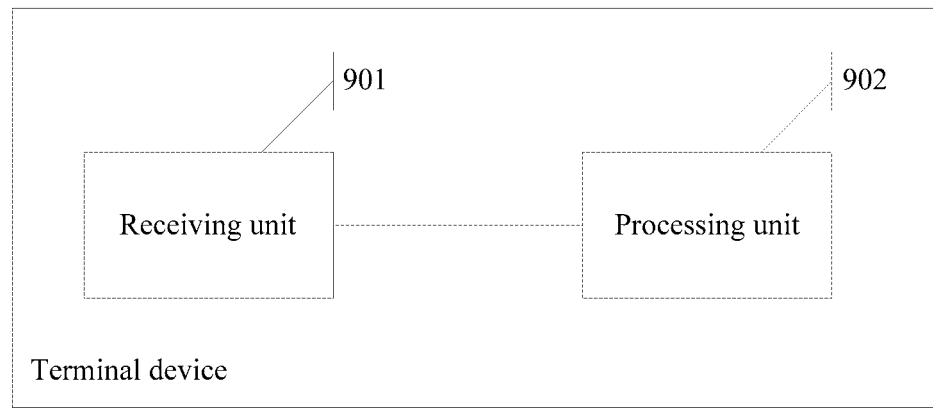
FIG. 9 is a schematic structural diagram of a network device according to an embodiment of the present disclosure.

Referring to FIG. 9, based on the same inventive concept, a terminal device is provided. The terminal device may include a receiving unit 901 and a processing unit 902.

The terminal device may be configured to perform the method in FIG. 2 to FIG. 6. Therefore, for functions implemented by the units in the terminal device, refer to the descriptions in the foregoing method part, and details are not further described.

Figure 10:
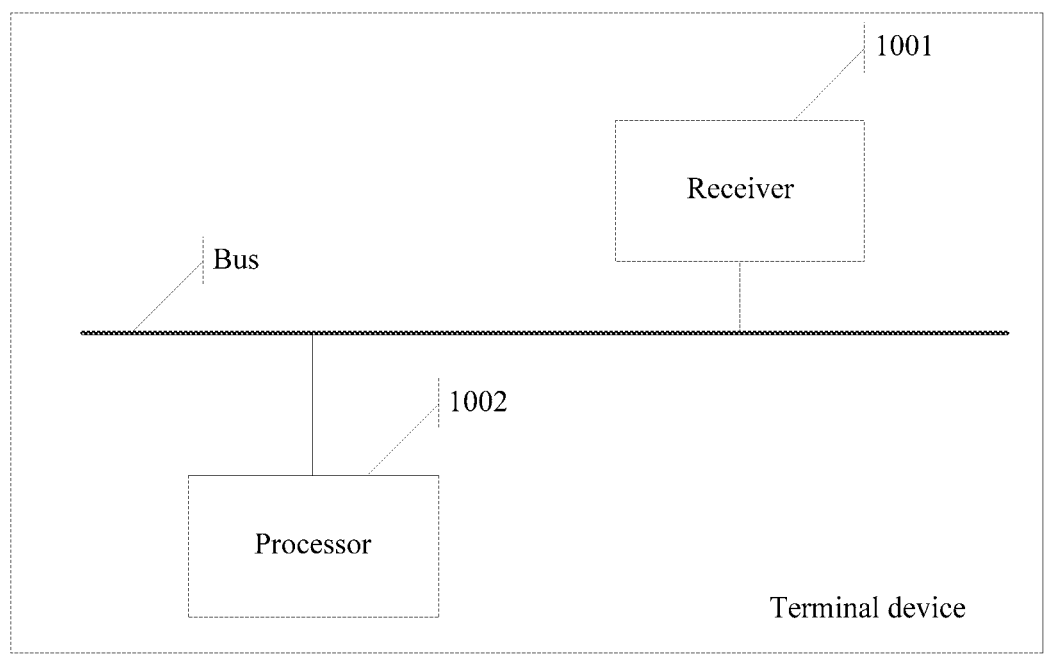
FIG. 10 is a schematic structural diagram of a terminal device according to an embodiment of the present disclosure.

Referring to FIG. 10, FIG. 10 is a schematic structural diagram of a possible entity of the terminal device shown in FIG. 9. In an actual application, a physical device corresponding to the receiving unit 901 may be a receiver 1001, and a physical device corresponding to the processing unit 902 may be a processor 1002.

The processor 1002 may include, for example, a CPU or an ASIC, and may be one or more integrated circuits executed by a control program, a hardware circuit developed by using an FPGA, or a baseband chip.

The receiver 1001 is configured to perform network communication with an external device, for example, may communicate with the external device by using a network such as an Ethernet, a radio access network, or a wireless local area network.

The receiver 1001 may be connected to the processor 1002 by using a bus (which is used as an example in FIG. 10), or may be connected to the processor 1002 by using a special connection cable.

Code corresponding to the foregoing method is burned into a chip by designing and programming the processor 1002, so that the chip can perform the foregoing method shown in FIG. 2 to FIG. 6 during operation. How to design and program the processor 1002 is a technology known to a person skilled in the art, and details are not described herein.

A network device may separately set a modification period (namely, a first period) for first-type system information (which, for example, may include paging configuration information), to ensure that the first-type system information is not to be modified in the first period. For example, the first period may be greater than a DRX cycle. In this way, when the terminal device wakes up based on the DRX cycle, a time when the terminal device wakes up is still in the first period. The terminal device may normally receive a paging message indicating that the paging configuration information is to be modified, thereby obtaining new paging configuration information in time and avoiding missing a subsequent paging message.

In the present disclosure, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Apart or all of the units may be selected according to actual needs to achieve the embodiments of the present disclosure.

Functional units in the embodiments of the present disclosure may be integrated into one processing unit, or each of the units may be an independent physical module.

When the integrated unit is implemented in the form of a software functional unit and sold or used as an independent product, the integrated unit may be stored in a computerreadable storage medium. Based on such an understanding, all of or a part of the technical solutions of the present disclosure may be implemented in a form of a software product. The computer software product is stored in a storage medium and includes several instructions for instructing a computer device (which may be a personal computer, a server, or a network device) or a processor (processor) to perform all or a part of the steps of the methods described in the embodiments of the present disclosure. The foregoing storage medium includes: any medium that can store program code, such as a USB (Universal Serial Bus) flash drive), a removable hard disk, a read-only memory (ROM), a random access memory (RAM), a magnetic disk, or an optical disc.

The foregoing embodiments are merely used to describe the technical solutions of the present disclosure. The foregoing embodiments are merely intended to help understand the method of the present disclosure, and shall not be construed as a limitation on the embodiments of the present disclosure. Any variation or replacement readily figured out by a person skilled in the art shall fall within the protection scope of the embodiments of the present disclosure.

What is claimed is:

1. A system information sending method, comprising:
   obtaining, by a network device, a first period; and
   sending, by the network device based on the first period, first-type system information to a terminal device, wherein content of the first-type system information sent by the network device to the terminal device remains unchanged in the first period, wherein the first period is a predetermined duration, wherein the predetermined duration is an integer multiple of a discontinuous reception (DRX) cycle defaulted by the network device or an integer multiple of a modification period (MP), and wherein the first period is a maximum configurable DRX cycle for the terminal device, or the first period is a MP set by the network device for the first-type system information.

2. The method according to claim 1, further comprising:
   sending, by the network device, a paging message to the terminal device in an $i^{th}$ first period, wherein a DRX cycle of the terminal device is less than or equal to the first period, and the paging message carries a first modification indication for indicating whether first-type system information sent in a next first period is to be modified, or for indicating whether any system information sent in a next MP is to be modified, wherein i is a positive integer.

3. The method according to claim 2, wherein the paging message carries a second modification indication for indicating whether second-type system information sent in the next MP or the next first period is to be modified, and wherein the second-type system information comprises system information other than the first-type system information.

4. The method according to claim 2, further comprising:
   sending, by the network device, a paging message to the terminal device in an $i^{th}$ first period, wherein a DRX cycle of the terminal device is less than or equal to the MP and less than or equal to the first period, and the paging message carries a first modification indication for indicating whether first-type system information sent in a next first period is to be modified, or for indicating whether any system information sent in a next modification period MP is to be modified, wherein i is a positive integer.

5. The method according to claim 2, further comprising:
   sending, by the network device, a paging message to the terminal device in an $i^{th}$ first period, wherein a DRX cycle of the terminal device is greater than the MP and less than or equal to the first period, and the paging message carries a first modification indication for indicating whether first-type system information sent in a next first period is to be modified, wherein i is a positive integer.

6. A system information update method, comprising:
   receiving, by a terminal device in an $i^{th}$ first period, a first message sent by a network device, wherein the first message carries a first modification indication, wherein the first period is a modification period set by the network device for first-type system information, wherein the first-type system information is system information the terminal device is required to obtain in time to avoid missing a subsequent paging message, wherein the system information is system information other than system information block type 1 (SIB1), and i is a positive integer; and
   determining, by the terminal device based on the first modification indication, whether to update the first-type system information in an $(i+1)^{th}$ first period, wherein the first modification indication indicates a modification status of the first-type system information or a modification status of any system information.

7. The method according to claim 6, further comprising:
   determining, by the terminal device, that a DRX cycle configured for the terminal device is greater than a modification period (MP) of second-type system information, and that the DRX cycle is greater than the first period; or
   determining, by the terminal device, that a DRX cycle configured for the terminal device is less than or equal to the first period.

8. The method according to claim 7, wherein when the DRX cycle is less than or equal to the first period,
   receiving, by a terminal device in an $i^{th}$ first period, a first message sent by a network device comprises:
      receiving, by the terminal device in the $i^{th}$ first period, a paging message that carries the first modification indication sent by the network device; and
   determining, by the terminal device based on the first modification indication, whether to update the first-type system information in an $(i+1)^{th}$ first period comprises:
      updating, by the terminal device, the first-type system information in the $(i+1)^{th}$ first period when the first modification indication indicates that first-type system information sent in a next first period is to be modified, or
      updating, by the terminal device, the first-type system information in a next MP or the $(i+1)^{th}$ first period when the first modification indication indicates that any system information sent in the next MP is to be modified.

9. The method according to claim 8, wherein when the DRX cycle is less than or equal to the first period and less than or equal to the MP,
   receiving, by a terminal device in an $i^{th}$ first period, a first message sent by a network device comprises:
      receiving, by the terminal device in the $i^{th}$ first period, a paging message that carries the first modification indication sent by the network device; and
   determining, by the terminal device based on the first modification indication, whether to update the first-type system information in an $(i+1)^{th}$ first period comprises:

updating, by the terminal device, the first-type system information in the (i+1)$^{th}$ first period when the first modification indication indicates that first-type system information sent in a next first period is to be modified, or updating, by the terminal device, the first-type system information in a next MP or the (i+1)$^{th}$ first period when the first modification indication indicates that any system information sent in the next MP is to be modified.

10. The method according to claim 8, wherein when the DRX cycle is less than or equal to the first period and greater than the MP, receiving, by a terminal device in an i$^{th}$ first period, a first message sent by a network device comprises:
  receiving, by the terminal device in the i$^{th}$ first period, a paging message that carries the first modification indication sent by the network device; and
determining, by the terminal device based on the first modification indication, whether to update the first-type system information in an (i+1)$^{th}$ first period comprises:
  updating, by the terminal device, the first-type system information in the (i+1)$^{th}$ first period when the first modification indication indicates that first-type system information sent in a next first period is to be modified, or
  updating, by the terminal device, the first-type system information in a next MP or the (i+1)$^{th}$ first period when the first modification indication indicates that any system information sent in the next MP is to be modified.

11. A network device, comprising:
at least one processor, the at least one processor configured to obtain a first period; and
a transmitter, the transmitter configured to send, based on the first period, first-type system information to a terminal device, wherein content of the first-type system information sent by the network device to the terminal device remains unchanged in the first period, wherein the first period is a predetermined duration, wherein the predetermined duration is an integer multiple of a discontinuous reception (DRX) cycle defaulted by the network device or an integer multiple of a modification period (MP), and wherein the first period is a maximum configurable DRX cycle for the terminal device, or the first period is a MP set by the network device for the first-type system information.

12. The network device according to claim 11, wherein the transmitter is further configured to:
send a paging message to the terminal device in an i$^{th}$ first period, wherein a DRX cycle of the terminal device is less than or equal to the first period, and the paging message carries a first modification indication for indicating whether first-type system information sent in a next first period is to be modified, or for indicating whether any system information sent in a next MP is to be modified, wherein i is a positive integer.

13. The network device according to claim 12, wherein the paging message further carries a second modification indication for indicating whether second-type system information sent in the next MP or the next first period is to be modified, and the second-type system information comprises system information other than the first-type system information.

14. The network device according to claim 12, wherein the transmitter is further configured to:
send a paging message to the terminal device in an i$^{th}$ first period, wherein a DRX cycle of the terminal device is less than or equal to the MP and less than or equal to the first period, and the paging message carries a first modification indication for indicating whether first-type system information sent in a next first period is to be modified, or for indicating whether any system information sent in a next MP is to be modified, wherein i is a positive integer.

15. The network device according to claim 12, wherein the transmitter is further configured to:
send a paging message to the terminal device in an i$^{th}$ first period, wherein a DRX cycle of the terminal device is greater than the MP and less than or equal to the first period, and the paging message carries a first modification indication for indicating whether first-type system information sent in a next first period is to be modified, wherein i is a positive integer.

16. A terminal device, comprising:
a receiver, configured to receive, in an i$^{th}$ first period, a first message sent by a network device, wherein the first message carries a first modification indication, wherein the first period is a modification period set by the network device for first-type system information, wherein the first-type system information is system information the terminal device is required to obtain in time to avoid missing a subsequent paging message, wherein the system information is system information other than system information block type 1 (SIB1), and i is a positive integer; and
at least one processor, the at least one processor configured to determine, based on the first modification indication, whether to update the first-type system information in an (i+1)$^{th}$ first period, wherein the first modification indication indicates a modification status of the first-type system information or a modification status of any system information.

17. The terminal device according to claim 16, wherein the at least one processor is further configured to:
determine that a DRX cycle configured for the terminal device is greater than an MP of second-type system information, and that the DRX cycle is greater than the first period; or
determine that a DRX cycle configured for the terminal device is less than or equal to the first period.

18. The terminal device according to claim 17, wherein:
the receiver is configured to when the DRX cycle is less than or equal to the first period, receive, in the i$^{th}$ first period, a paging message that carries the first modification indication sent by the network device; and
the at least one processor is configured to:
  update the first-type system information in the (i+1)$^{th}$ first period when the first modification indication indicates that first-type system information sent in a next first period is to be modified, or
  update the first-type system information in a next MP or the (i+1)$^{th}$ first period when the first modification indication indicates that any system information sent in the next MP is to be modified.

19. The terminal device according to claim 18, wherein:
the receiver is configured to when the DRX cycle is less than or equal to the first period and less than or equal to the MP, receive, in the i$^{th}$ first period, a paging message that carries the first modification indication sent by the network device; and the at least one processor is configured to:
    update the first-type system information in the $(i+1)^{th}$ first period when the first modification indication indicates that first-type system information sent in a next first period is to be modified, or
    update the first-type system information in a next MP or the $(i+1)^{th}$ first period when the first modification indication indicates that any system information sent in the next MP is to be modified.

20. The terminal device according to claim 18, wherein:
the receiver is configured to when the DRX cycle is less than or equal to the first period and greater than the MP, receive, in the $i^{th}$ first period, a paging message that carries the first modification indication sent by the network device; and
the at least one processor is configured to:
    update the first-type system information in the $(i+1)^{th}$ first period when the first modification indication indicates that first-type system information sent in a next first period is to be modified, or
update the first-type system information in a next MP or the $(i+1)^{th}$ first period when the first modification indication indicates that any system information sent in the next MP is to be modified.

* * * * *